(12) United States Patent
Rasset et al.

(10) Patent No.: US 8,613,338 B2
(45) Date of Patent: Dec. 24, 2013

(54) FLAT PLATE FRONT FRAME FOR A TRACTOR HAVING BALLAST, BUMPER, AND TOW CABLE CONNECTIONS

(75) Inventors: John T. Rasset, Barnesville, MN (US); Russell V. Stoltman, Argusville, ND (US); David S. Booth, Fargo, ND (US); Bryan J. Garberg, Morehead, MN (US); Carl J. Hagele, Chicago, IL (US); Chad A. Bautz, Fargo, ND (US); Landon J. Fries, Spicer, MN (US)

(73) Assignee: CNH America LLC, New Holland, PA (US)

( * ) Notice: Subject to any disclaimer, the term of this patent is extended or adjusted under 35 U.S.C. 154(b) by 459 days.

(21) Appl. No.: 12/818,980

(22) Filed: Jun. 18, 2010

(65) Prior Publication Data

US 2011/0308870 A1 Dec. 22, 2011

(51) Int. Cl.
*B60K 11/04* (2006.01)

(52) U.S. Cl.
USPC .......... 180/68.4; 180/311; 180/312; 180/900; 180/69.1; 180/68.6; 280/760; 280/781; 280/785

(58) Field of Classification Search
USPC ............ 180/68.4, 311, 312, 900, 69.1, 69.22, 180/69.23, 68.6; 280/760, 781, 785, 797, 280/799, 800; 296/203.1
See application file for complete search history.

(56) References Cited

U.S. PATENT DOCUMENTS

| | | | |
|---|---|---|---|
| 738,000 A | 9/1903 | Carpenter | |
| 1,144,099 A | 6/1915 | Black | |
| 1,386,894 A | 8/1921 | Myrmo | |
| 1,424,177 A | 8/1922 | Nilson | |
| 1,563,341 A | 12/1925 | Clark | |
| 1,595,264 A | 8/1926 | Treiman | |
| 1,702,218 A | 2/1929 | McKissick | |
| 1,715,192 A | 5/1929 | Fortin | |
| 1,805,822 A | 5/1931 | Hanses | |
| 2,099,789 A * | 11/1937 | Baker et al. | 180/68.6 |
| 2,426,532 A * | 8/1947 | Tierney | 280/504 |
| 2,797,121 A | 6/1957 | Aud | |
| 2,993,721 A | 7/1961 | Bowman | |

(Continued)

FOREIGN PATENT DOCUMENTS

| | | |
|---|---|---|
| GB | 2423510 A | 8/2006 |
| JP | 2007112233 A | 5/2007 |
| WO | 9511810 A1 | 5/1995 |

*Primary Examiner* — J. Allen Shriver, II
*Assistant Examiner* — Bryan Evans
(74) *Attorney, Agent, or Firm* — Sue C. Watson

(57) ABSTRACT

A flat plate nose frame design for a tractor in which a thick, flat structural plate is connected to and forwardly extends from the conventional frame rails of the tractor. The flat plate nose frame design increases vertical clearance under the hood without raising the hood height or reducing ground clearance. The nose plate is contoured to match the exterior contours of the tractor grill and hood eliminating the need for a separate aesthetic component covering the nose plate. The nose plate features a pair of vertically aligned short-height frame plates extending forwardly along the axis from the deep-section frame rails to increase strength in the flat nose plate without significantly increasing vertical height of the nose plate assembly. The flat plate nose frame is capable of withstanding operational loads as well as supporting a weight package or front-mounted implements. Additionally, a releasable connector for a tow cable common on large tractors may also be connected to and supported by the flat plate nose frame without adverse impact to its primary advantages.

20 Claims, 7 Drawing Sheets

(56) References Cited

U.S. PATENT DOCUMENTS

| | | |
|---|---|---|
| 3,727,712 A | 4/1973 | Colloton |
| 3,749,436 A | 7/1973 | Hitchcock |
| 4,068,876 A | 1/1978 | Muellner |
| 4,073,042 A | 2/1978 | Miller |
| 4,635,953 A | 1/1987 | Robertson et al. |
| 5,316,079 A | 5/1994 | Hedeen |
| 5,476,280 A | 12/1995 | MacMullan |
| 5,725,247 A | 3/1998 | Nilsson et al. |
| 5,779,289 A | 7/1998 | Alexander, Jr. |
| 5,960,899 A | 10/1999 | Roach |
| 5,975,624 A * | 11/1999 | Rasidescu et al. ....... 296/203.01 |
| 6,595,397 B2 | 7/2003 | Teich |
| 6,736,232 B1 | 5/2004 | Bergstrom et al. |
| 6,871,875 B2 * | 3/2005 | Grimm et al. ................. 280/785 |
| 6,880,656 B2 | 4/2005 | Pfusterschmid et al. |
| 7,401,673 B2 | 7/2008 | Fukazawa et al. |
| 7,413,397 B2 | 8/2008 | Muramoto et al. |
| 7,467,679 B2 | 12/2008 | Honzek et al. |
| 7,540,543 B2 | 6/2009 | Kemp et al. |
| 7,703,834 B1 | 4/2010 | Hardy et al. |
| 8,083,111 B2 * | 12/2011 | Lase ............................ 224/410 |
| 2008/0246289 A1 * | 10/2008 | Skinner et al. ................ 293/115 |
| 2009/0001688 A1 | 1/2009 | Bruns et al. |
| 2009/0014993 A1 * | 1/2009 | Tope ............................. 280/781 |
| 2010/0059976 A1 | 3/2010 | Defrancq |

* cited by examiner

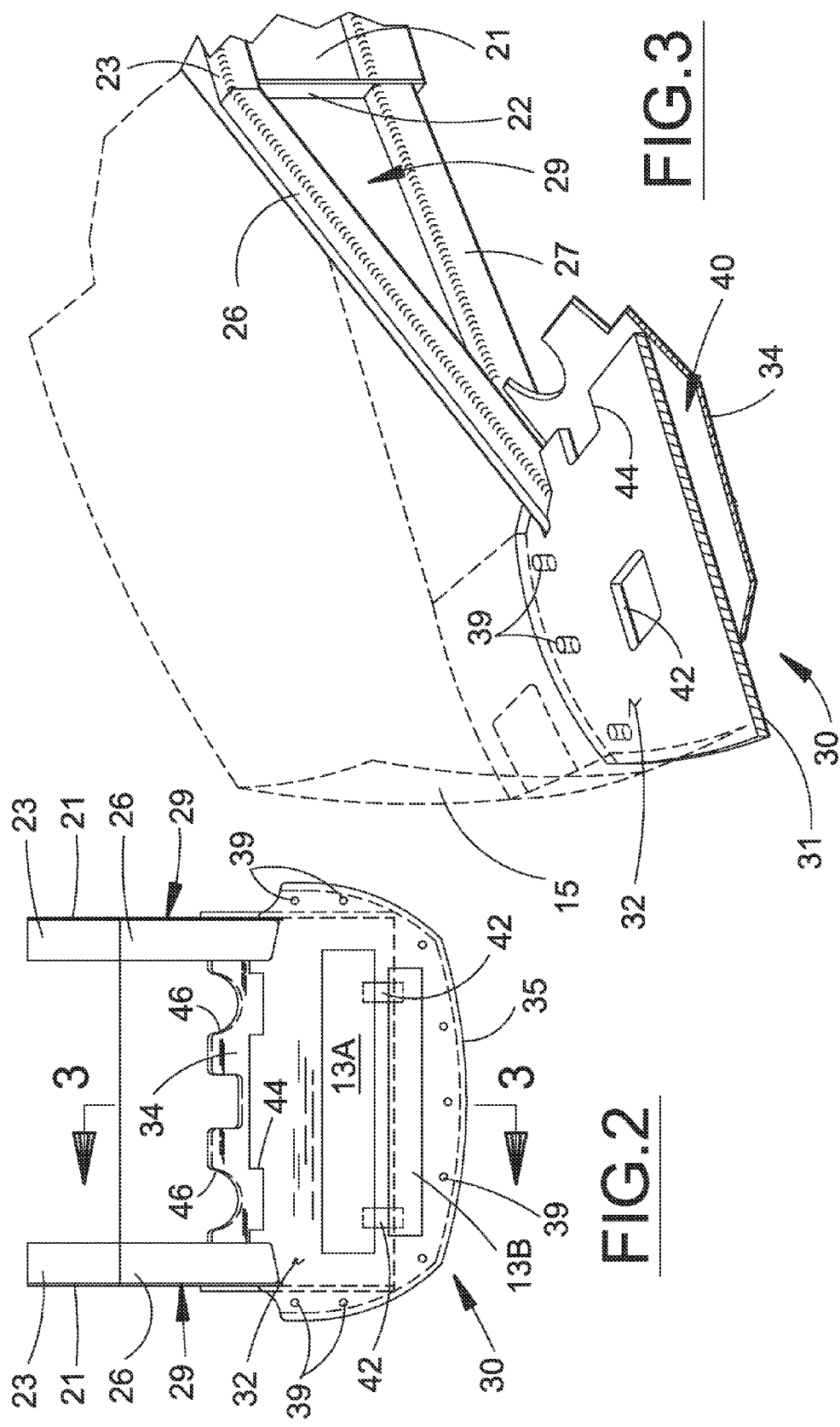

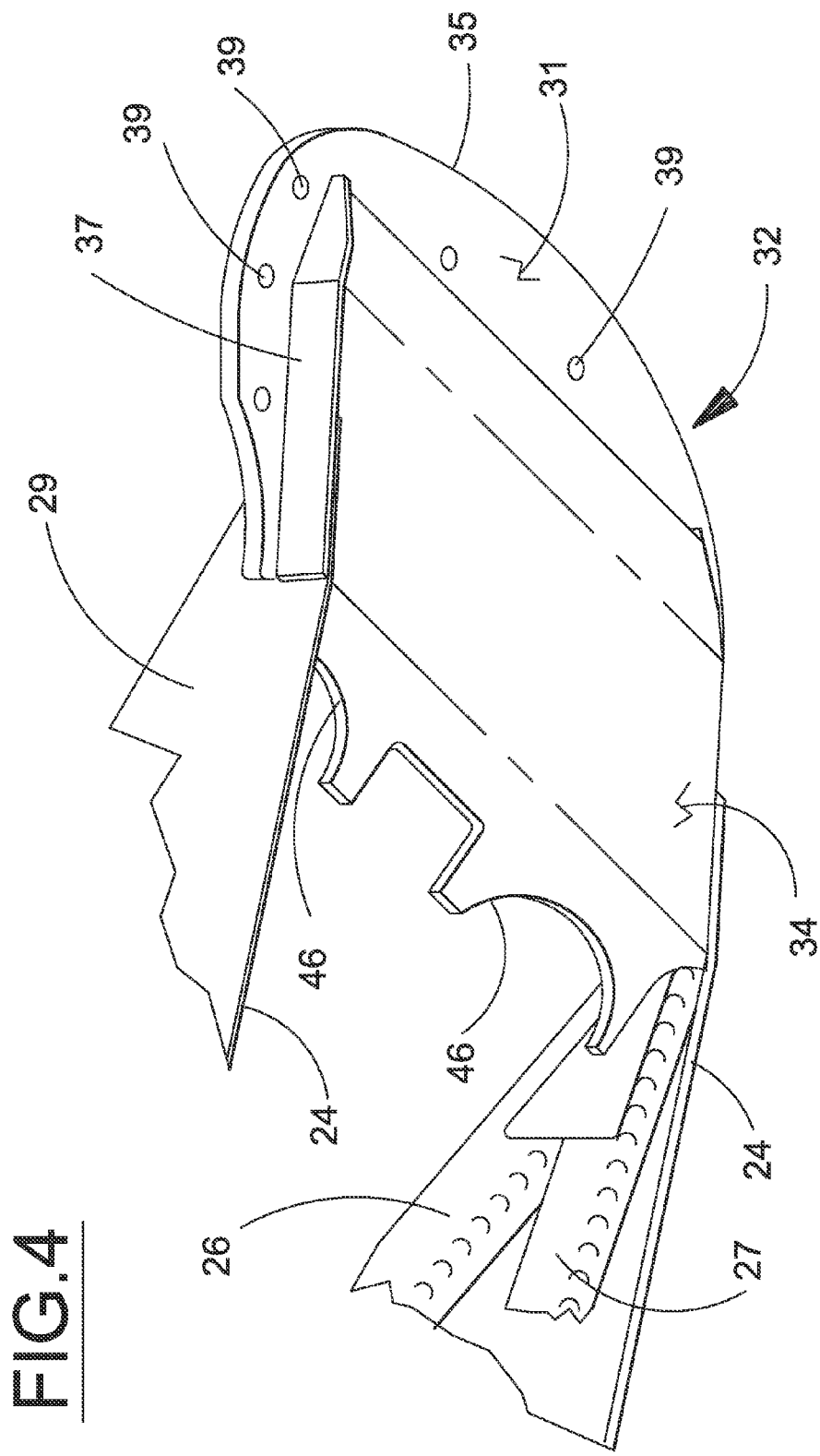

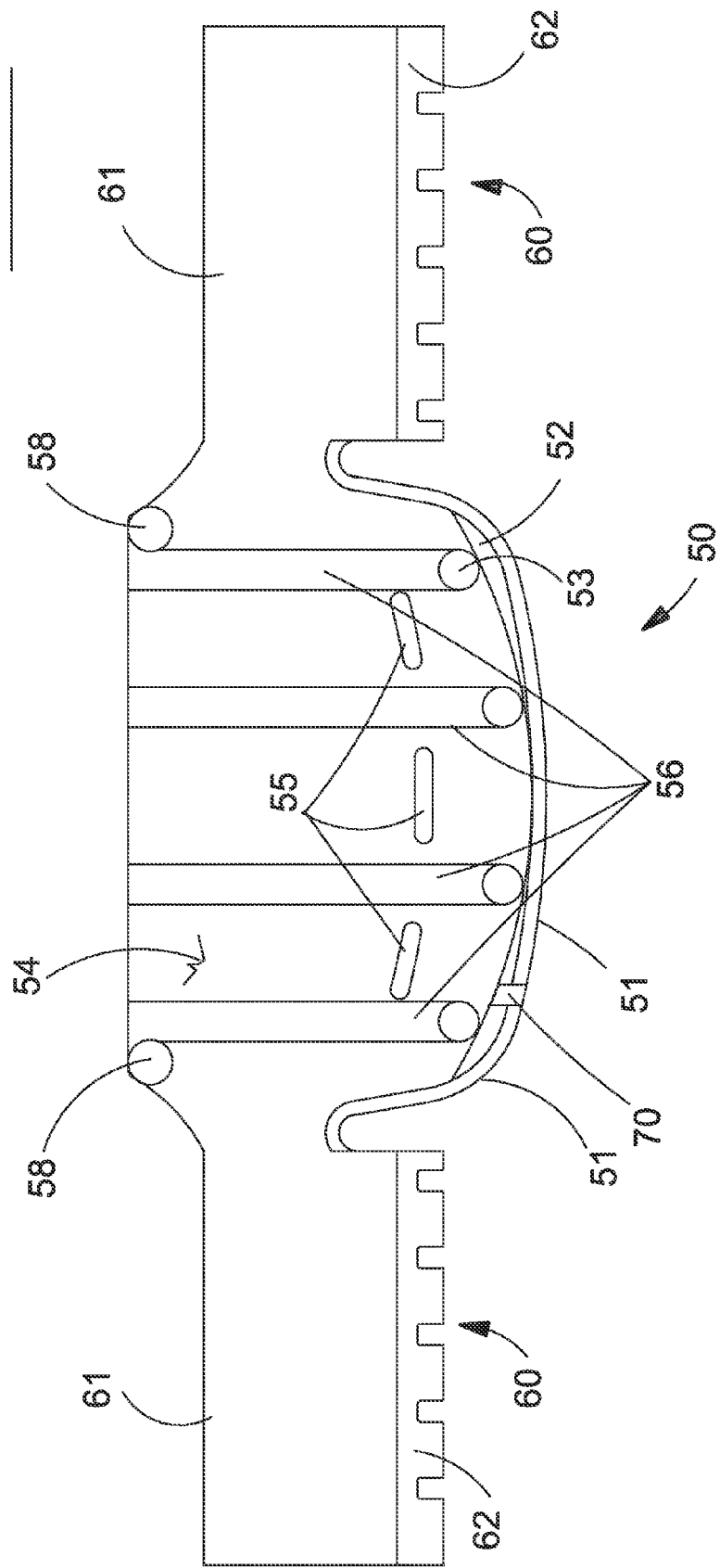

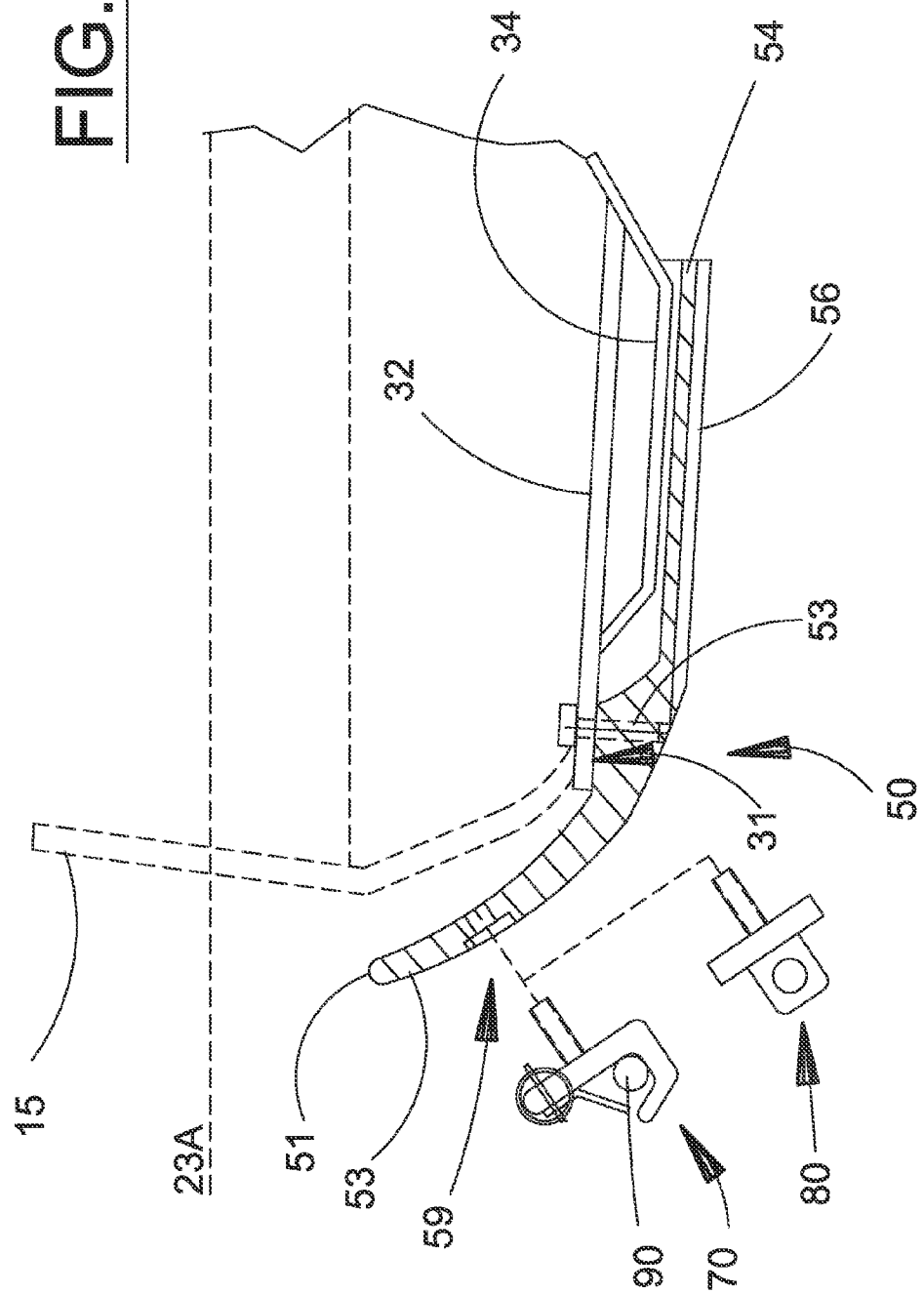

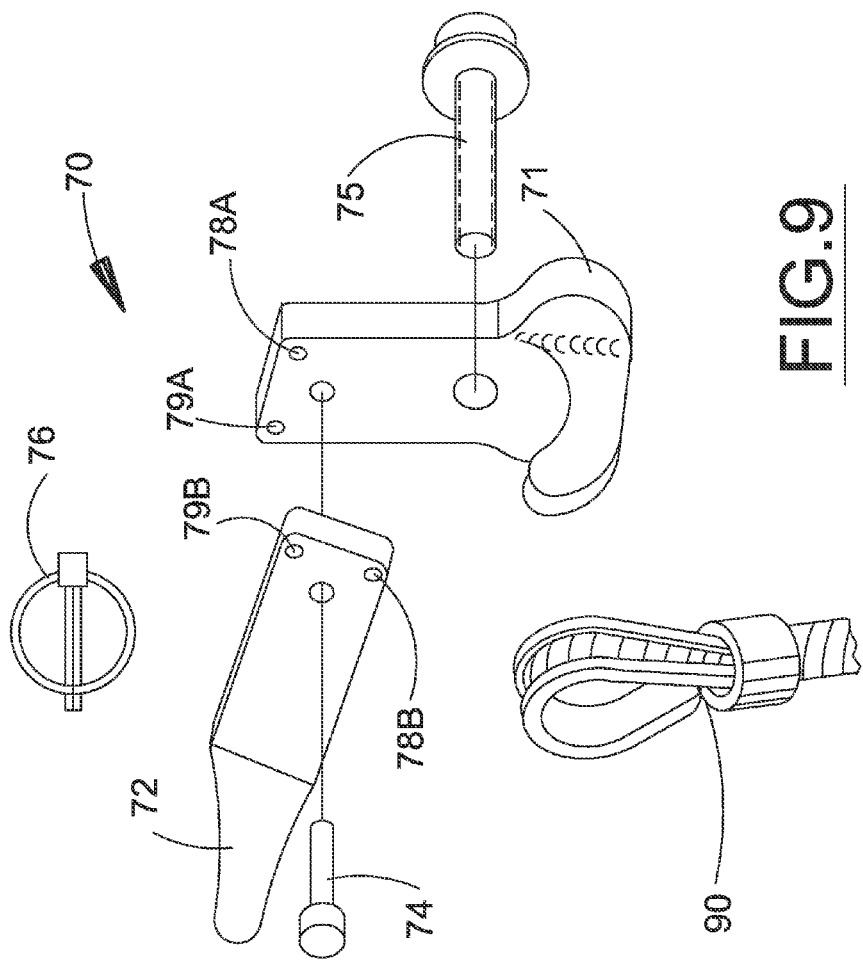
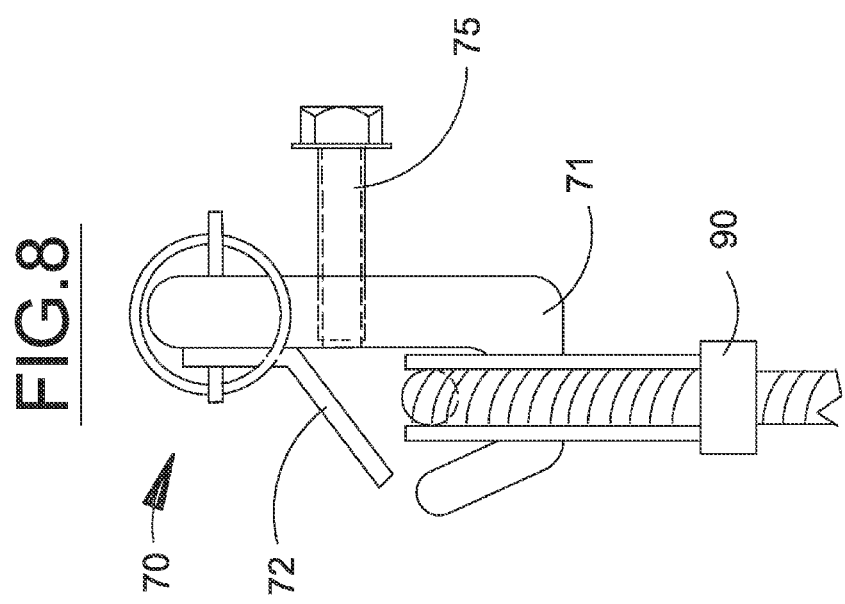

FLAT PLATE FRONT FRAME FOR A TRACTOR HAVING BALLAST, BUMPER, AND TOW CABLE CONNECTIONS

BACKGROUND OF THE INVENTION

The present invention relates to an improved front frame design for a tractor and, more particularly, to flat plate front frame nose for a tractor that provides additional under hood vertical clearance without increasing hood height or reducing ground clearance that will support an integral bumper and counterweight attachment.

With the increase in horsepower and clean air emission requirements, cooling requirements for tractors are dramatically increasing. Meeting these increasing requirements requires corresponding increases in the size of cooling packages for the tractor power plants. However, the height above the ground of the hood under which the cooling package must be positioned is limited in order to maintain adequate visibility from the operator's cab over the hood. Similarly, reducing ground clearance is also not a viable option as ground clearance and angle of approach must be maintained sufficient to provide adequate tractor mobility over uneven terrain.

The STX and TJ series four-wheel drive tractors manufactured by Case New Holland are typical examples of tractors where such considerations are increasingly important. These tractor frames conventionally comprise a box-section frame having generally vertically aligned, deep section frame rails extending forward from the front axle to near the forward-most portion of the tractor hood to provide support for the cooling package. Weight packages or implements may also be attached to the forward end of the frame adding to the structural requirements of the frame. The structural requirements on these large tractors are substantial; applied forces on the front end of the frame can easily exceed 10,000 pounds. Additionally, changes to the frame configuration must also accommodate hose routing, cooling package connection and support, hood and grill sealing, and enable easy removal of accumulated field debris. Further, some large tractors feature a tow cable, an end of which is often secured to the forwardmost portion of the frame while not in use where it may be easily accessed when needed. Modification of the forwardmost portion of the tractor frame must also provide a connection for the tow cable.

It would, therefore, be a great advantage to provide a modified nose frame design for a tractor that would enable a larger cooling package to be fitted without increasing the height of the hood from the ground or reducing ground clearance beneath to overcome the above problems and disadvantages. Further advantages would be realized by a modified nose frame that allowed convenient connection of a bumper and weight package without significant adverse affect on the under-hood gains offered by the redesigned nose frame. Still further advantages result from a nose frame design that affords easy debris removal or even reduces the accumulation of debris. Still further advantages would be realized if the modified nose frame easily integrated with existing frame, hood, and grill designs with only minor modification of the tractor frame design.

SUMMARY OF THE INVENTION

Accordingly, the present invention, in any of the embodiments described herein, may provide one or more of the following advantages:

It is an object of the present invention to provide a flat plate front nose frame design for a tractor that reduces the height of the tractor frame to provide increased under hood vertical clearance for a cooling package.

It is another object of the present invention to provide flat plate front nose frame that spans the width of the tractor frame and may be contoured to aesthetically match the contours of the above-mounted grill and hood.

It is a further object of the present invention to provide a flat plate nose frame design for a tractor that reduces debris accumulation at the nose of the tractor.

It is a further object of the present invention to provide a flat plate nose frame design for a tractor that is capable of supporting loads imposed by attached implements or ballast weights.

It is a further object of the present invention to provide a bumper for connection to a flat plate nose frame design that enhances the structural capability of the frame, protects the frame from damage, and provides integral attachments for ballast weights.

It is a still further object of the present invention to provide a flat plate nose frame design for a tractor that accommodates routing of hoses between the tractor and the cooling package.

It is a still further object of the present invention to provide a bumper for connection to a flat plate nose frame design that minimizes disruption to cooling air flow while protecting the frame from damage resulting from impact with the ground or other objects.

It is a still further object of the present invention to provide a flat plate nose frame design for a tractor that incorporate mounting connections for the cooling package, hood, and grill components without the need for additional connection subassemblies.

It is a still further object of the present invention to a flat plate nose frame design for a tractor that is easily adapted to an existing frame structure and requires minimal modification to the hood and grill.

It is a still further object of the present invention to provide a flat plate nose frame design for a tractor that is durable in construction, inexpensive of manufacture, carefree of maintenance, easily assembled, and simple and effective to use.

These and other objects are achieved by providing a flat plate nose frame design for a tractor in which a thick, flat structural plate is connected to and forwardly extends from the conventional frame rails of the tractor. The flat plate nose frame design increases vertical clearance under the hood without raising the hood height or reducing ground clearance. The nose plate is contoured to match the exterior contours of the tractor grill and hood eliminating the need for a separate aesthetic component covering the nose plate. The nose plate features a pair of vertically aligned short-height frame plates extending forwardly along the axis from the deep-section frame rails to increase strength in the flat nose plate without significantly increasing vertical height of the nose plate assembly. The flat plate nose frame is capable of withstanding operational loads as well as supporting a weight package or front-mounted implements. A bumper having support structures for ballast weight configured for connection to the nose plate in a manner that that increases the strength of the nose frame and protects the nose plate from damage without adversely affecting airflow to the grill is also disclosed. Additionally, a releasable connector for a tow cable common on large tractors may also be connected to the bumper and supported by the flat plate nose frame without adverse impact to its primary advantages.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a partial plan view of the forward portion of a tractor chassis showing the flat note plate interface with the tractor frame rails;

FIG. 3 is a partial perspective view of one embodiment of the flat nose plate showing the section view taken along line 3-3 of FIG. 2 with details of the under-plate stiffener;

FIG. 4 is a partial perspective view of the underside of the front nose plate showing the outboard view of the under-plate stiffener;

FIG. 6 is a perspective view of the lower side of the bumper shown in FIG. 5;

FIG. 7 is a section view taken along line 7-7 of FIG. 5 showing the relationship between the bumper and the nose plate assembly; and FIGS. 8 and 9 are two opposing views of a tow cable hook for use with the bumper of the present invention.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
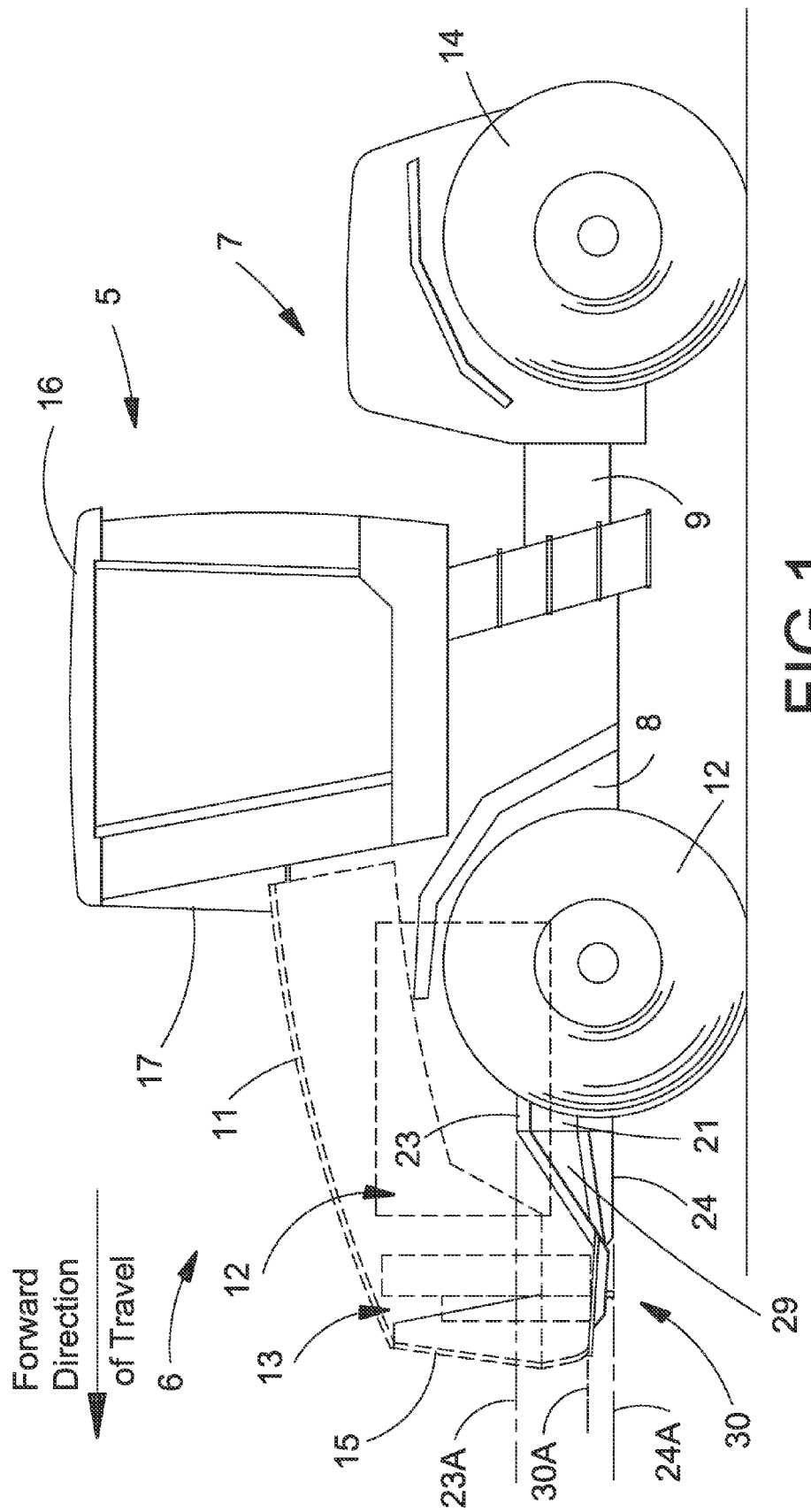
FIG. 1 is a side elevation view of an agricultural tractor of the type on which the present invention is advantageous.

Referring now to the drawings, in FIG. 1 there is illustrated a tractor 5 which is a four-wheel drive tractor typically used for such purposes as agriculture, earthmoving, construction, and the like. Tractor 5 includes a front segment 6 and a rear segment 7, connected together for pivotal movement one relative to the other, about a central pivotal axis (not shown) therebetween. Front segment 6 is drivingly supported by front wheels 12 on opposite sides thereof, and rear segment 7 is drivingly supported by rear wheels 14 on either side thereof. Front segment 6 includes a front chassis 8, and rear segment 7 includes a rear chassis 9. An engine 12 is supported by front chassis under a front hood 11. A cooling package 13, typically including an engine coolant radiator, one or more oil coolers, and an engine intercooler, is also frame-supported under the forward-most portion of hood 11 ahead of engine 12 and behind a forwardly disposed intake grill 15. An operator cab 16 with forward windshield 17 is supported on the front chassis aft of hood 11.

Tractor 5, as shown, relies on an articulated chassis for steering; other steering arrangements are conceived as benefiting from at least one aspect of the present invention. The STX and TJ series four-wheel drive tractors manufactured by Case New Holland are typical examples of tractors of the type on which the present invention is beneficial. Such tractors feature relatively higher horsepower engines for powering larger PTO-powered implements or for pulling large ground engaging implements, though the invention may benefit virtually any agricultural tractor or prime mover in which the need for additional under-hood vertical clearance is needed.

Front chassis 8 includes a pair of spaced-apart frame channels 21 (one shown) extending longitudinally of the tractor. Frame channels 21 are conventionally deep-section channels with a top edge or flange 23 generally defining the top of the chassis and a bottom edge or flange 24 defining the bottom. In a conventional frame arrangement, frame channels 21 extend to the forwardmost portion of the tractor, shown as extension lines 23A and 24A. The hood 11, grill 15 and cooling package 13 would conventionally be supported atop the chassis rails, generally above extension line 23A. Portions of mounting structure would be mounted in the space between the frame channels 21, but the cooling package 13 requires a generally unobstructed air flow and thus sits atop the frame channels. A bumper and skid plate would typically be mounted on the bottom of the chassis rails, generally disposed below extension line 24A. In the present invention, the forwardmost portion of the frame channels 21 is replaced with a transition frame 29 which tapers the vertical frame section downwardly and terminates in flat plate nose support assembly 30. Flat plate nose assembly 30 features a significantly reduced vertical section depth compared to the frame channel 21 (top of the plate shown by extension line 30A) and thereby increases available under-hood clearance, approximately the distance shown between extension line 23A and 30A. By positioning the nose assembly 30 no lower than the frame channels it replaces, there is negligible impact on ground clearance. The forward end of nose assembly 30 is also slightly upwardly angled to reduce the tendency of the nose to dig into the ground during impacts therewith.

Referring to FIGS. 2 and 3, flat plate nose assembly is shown to comprise an upper plate 32 and a lower reinforcing plate 34. Upper plate 32 is a generally planar structure fabricated from a sufficiently strong and thick to provide the desired structural capability. In the embodiment shown, upper plate is formed from a steel plate having a thickness on the order of one inch. Additional strength is provided by lower reinforcing plate 34, also fabricated from steel plate, which is configured to increase bending stiffness of the upper plate 32. Lower reinforcing plate 34 is connected to the lower surface of the upper plate 32 at a laterally extending line rearwardly displaced from the forward or leading end of the upper plate leaving an unobstructed portion 31 on the lower side of the upper plate 32 to enable implements to be connected directly to the plate. Such implements may include bumper assemblies or sub-frames for support front-mounted devices such as sprayers. The lower plate is contoured to provide a generally smooth and compact lower and surface for the nose plate assembly. Minimizing protrusions and maintaining a generally smooth exposed surface contour reduces debris accumulated by the forward portion of the frame and affords a relatively low profile frame structure. An internal cavity 40 is created between upper plate 32 and spaced apart portion of the reinforcing plate 34. Internal cavity 40 provides a space in which wiring and hoses from the cooling package 13 may be conveniently directed rearwardly and protected by the adjacent plates 32, 34. Forward access openings 42 and rearward openings 44 provide access to the cavity 40 from above the upper plate 32. Openings into the cavity 40 from below are minimized to debris accumulation in the cavity. The rearwardmost portion of reinforcing plate 34 may also include reliefs 46 to provide straighter hose and cable pathways from the nose to the readwardly located powerplant and controls.

The transition frame 29 connecting frame channels 21 to the flat plate nose assembly 30 features a downwardly tapered profile as the frame section depth is reduced from the full section height of channels 21 to approximately one-quarter to one-third of the full section height. An upper gusset 26 and lower gusset 27 are connected to transition frame 29 and extend forwardly from the forward end 22 of frame channel 21 to an apex with the flat plate nose assembly. The gussets 26, 27 provide lateral and vertical stiffness to the nose frame extending from the convention frame channels 21.

Upper plate 32 is provided with mounting structures in the nature of through-holes, threaded holes, and the like, for attaching elements of cooling package 13, other under-hood components, and the grill 15. Integrating the mounting connections enables the surface of upper plate 32 to remain relatively free from obstructions, easing debris removal capability. Similarly, the lower side of upper plate 32 may also be provided with mounting structures in the nature of through-holes, threaded holes, and the like, in the unobstructed portion 31 for attaching a skid plate or bumper.

Upper plate 32 also features a contoured forward periphery 35 which is configured to match the forward contour of the grill 15 at the interface connection between the grill 15 and the upper plate 32. The matched contours enable the flat plate nose assembly to function an aesthetic element without the need for additional covers or other debris-catching structures necessary to integrate the nose structure into the remainder of the tractor grill and engine cowling styling and aesthetic elements.

Referring now to FIG. 4, the lower side of the flat plate nose assembly 30 is shown further comprising a pair (one shown) of side gussets 37 which extend along the sides of lower reinforcing plate 34 to enclose the openings between the reinforcing plate 34 and the upper plate 32. The gussets 37 enclose internal cavity 40 and prevent the intrusion of debris into the cavity. The gussets 37 also increase the nose plate assembly's 30 bending resistance about a lateral axis so that the flat plate nose assembly can support the projected loadings.

Figure 5:
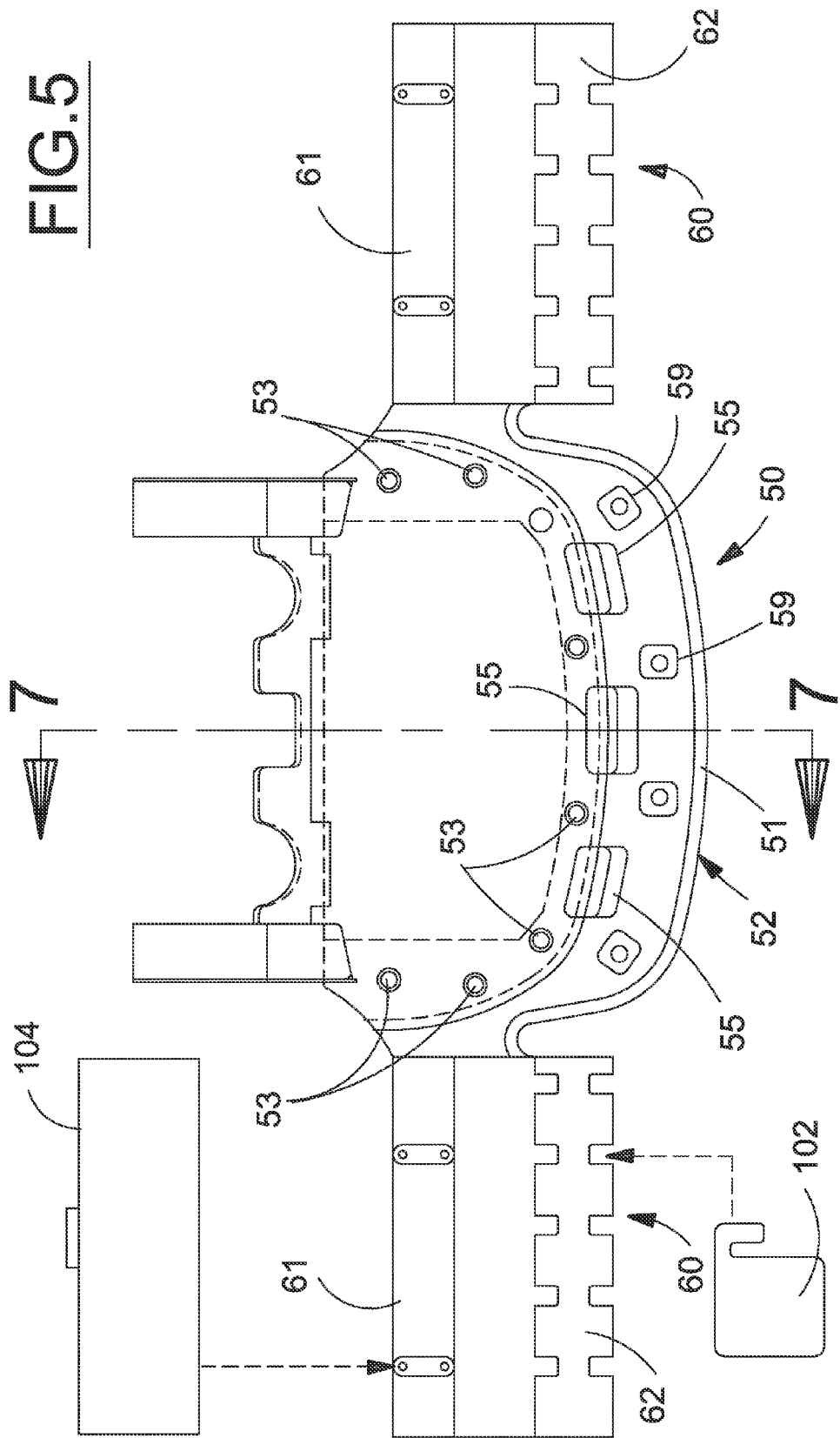
FIG. 5 is a plan view of the integrated bumper for connection to the front nose plate shown in FIGS. 1 through 4.

Now referring to FIGS. 5, 6, and 7, an integral nose bumper 50 for use with the nose assembly 30 is shown having a forward bumper portion 52 and a lower skid portion 54. Nose bumper 50 is configured to be connected to the tractor nose assembly 30, preferably by bolting along the unobstructed portion 31 adjacent the forward periphery 35 of the upper plate in a generally C-shaped pattern. A plurality of connections 53 on bumper 50 that are aligned with bumper receptacles 39 on the upper plate is provided for the connection and allows bumper 50 to be removed if necessary. The rigid connection also enables the nose bumper 50 to further strengthen the nose assembly 30.

Forward bumper portion 52 is shaped in plan to follow the contour of forward periphery 35 and angle upwardly from the lower side of the flat plate nose assembly 30 to shield the forward portion of the nose assembly 30 from impact. The extension of uppermost end 51 of forward bumper portion 52 is kept purposefully low to minimize airflow restrictions into the grill 15, yet high enough to protect the forward periphery 35 and the lower portions of the grill 15 from damage. A plurality of debris openings 55 are provided in near the junction of bumper portion 52 and lower skid portion 54 to minimize debris collection between the bumper 50 and the frame 30.

The skid portion 54 is integral with forward bumper portion 52 and extends rearwardly from bumper portion. Skid portion 54 and is disposed beneath the nose assembly 30 and lower reinforcing plate 34 to protect the lower reinforcing plate from damage. Reinforcing ribs 56 may be provided on the downward surface of skid portion 54 to further strengthen the bumper integral 50 and to provide clearance for fork lift tines for bumper removal. Lifting pads 58 may also be incorporated to provide jacking points for the tractor.

Bumper 50 is formed from a suitably strong and dense material to provide strength to withstand impacts with the ground or other objects and to provide ballast on the nose of the tractor. Bumper 50 also includes support structures 60 having ballast hangers 62 and storage connectors 61 for attaching items such as additional ballast plates 102 or storage containers 104. In the embodiment shown, support structures 60 extend transversely from either side of bumper 50. Support structures 60 are also formed from a suitably strong and dense material, preferably the same used for bumper 50.

Many large tractors of the type on which this invention is useful feature a tow cable to allow a second tractor to be connected to a first tractor for pulling implements, such as pan scrapers. These tow cables generally connect near the hitch or articulation joint on the underside of the chassis and provide a connecting loop on a free end of the cable near the front of the tractor for more convenient access. The bumper 50 also includes accessory connections 59 laterally spaced-apart along the forward surface for attaching accessories to the bumper. Accessory connections 59 are preferably arranged to provide one or more connection points near the longitudinal centerline of the tractor and one or more connection points more laterally displaced from the centerline. Such accessories may include a tow cable hook 70 for securing the free end of a permanently installed tow cable 90 used for operating two tractors in tandem or brackets 80 for connecting temporary tow cables that allow a disabled tractor to be pulled.

FIGS. 8 and 9 show the tow cable hook 70 which can be connected by a bolt 75 or equal to one of the bumper accessory connections 59 to position the free end of the short tow cable 90 in a more easily accessible location on the forward surface of bumper 50. Hook 70 is formed to allow the tow cable to be easily removed and preferably includes hook loop 71 and a locking catch 72 to secure the tow cable in the hook loop 71 when the cable is not. Locking catch 72 is pivotally attached to the upper portion of the hook loop structure using a pin, bolt 74 or the like, and configured to extend out and over the opening of the hook loop 71 to capture the tow cable when positioned in a first pivotal position. A conventional lynch pin 76 engaging aligned holes 78A or 79A in the hook loop 71 and holes 78B or 79B in the locking catch 72 keeps the locking plate in position. Only one lynch pin is required simultaneously engaging one hole on the locking plate 72 and one hole on the hook loop 71.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

What is claimed is:
1. A chassis for a tractor, the chassis comprising:
   a pair of longitudinally extending frame rails, each frame rail having a terminal end defining an end face of the frame rail, each frame rail further defining a top edge and a bottom edge;

a first transition frame extending from the terminal end of one of the frame rails and a second transition frame extending from the terminal end of the other of the frame rails, each of the first and second transition frames including an aft end coupled to the terminal end of one of the frame rails and a forward end spaced apart from the aft end, each of the first and second transition frames defining a tapered profile between the aft end and the forward end; and a generally planar nose plate coupled to the forward end of each of the first and second transition frames, the nose plate extending laterally from the first transition frame to the second transition frame, the nose plate extending forward from each of the first and second transition frames so as to be positioned at or above a line extending along the bottom edge of each frame rail, wherein a bottom of each of the first and second transition frames is positioned at or above the line extending along the bottom edge of each frame rail.

2. The chassis of claim 1, wherein the nose plate extends forward from each of the first and second transition frames so as to be positioned above the line extending along the bottom edge of each frame rail.

3. The chassis of claim 2, wherein the nose plate defines a top surface and an opposed bottom surface, the top surface being positioned between the line extending along the bottom edge of each frame rail and a line extending along the top edge of each frame rail.

4. The chassis of claim 1, wherein the nose plate includes a rearward end coupled to the forward end of each of the first and second transition frames and an opposed forward end, the forward end of the nose plate defining a contour generally corresponding to a contour of a grill of the tractor at an interface defined between the nose plate and the grill.

5. The chassis of claim 1, wherein the nose plate includes a top surface and an opposed bottom surface, the nose plate further including a rearward end coupled to the forward end of each of the first and second transition frames and an opposed forward end, further comprising a reinforcement plate coupled to the bottom surface at a connection location positioned between the forward and rearward ends of the nose plate.

6. The chassis of claim 5, wherein the connection location is spaced apart from the forward end of the nose plate a distance sufficient to allow an implement of the work vehicle to be coupled to the bottom surface at a location forward of the connection location.

7. The chassis of claim 5, wherein a central portion of the reinforcement plate is spaced apart from the nose plate such that a cavity is defined between the bottom surface and the reinforcement plate.

8. The chassis of claim 7, further comprising a pair of gussets, each gusset being coupled between a side edge of the reinforcement plate and the bottom surface of the nose plate so as to enclose the cavity.

9. The chassis of claim 7, wherein at least one aperture is defined through the nose plate to provide access to the cavity.

10. The chassis of claim 7, wherein the reinforcement plate includes a forward portion and a rearward portion extending upwardly from the central portion towards the bottom surface.

11. The chassis of claim 7, wherein the reinforcement plate is positioned at or above the line extending along the bottom edge of each frame rail.

12. The chassis of claim 1, wherein each of the first and second transition frames is tapered such that a height of each transition frame is reduced between its aft end and its forward end.

13. The chassis of claim 1, wherein the nose plate includes a rearward end coupled to the forward end of each of the first and second transition frames and an opposed forward end, the nose plate being angled upwardly in the direction of its forward end.

14. The chassis of claim 1, further comprising a bumper coupled to the nose plate, the bumper including a lower portion extending below the nose plate and a forward portion positioned in front of the nose plate.

15. The chassis of claim 14, wherein a plurality of debris openings are defined in the bumper.

16. The chassis of claim 14, further comprising reinforcing ribs formed on the lower portion.

17. The chassis of claim 14, wherein at least one lifting pad is formed on the bumper.

18. The chassis of claim 14, further comprising a support structure extending transversely from each side of the bumper.

19. The chassis of claim 14, further comprising a cable hook coupled to the bumper.

20. The chassis of claim 19, wherein the cable hook comprises a hook loop and a locking catch configured to be coupled to the hook loop so as to maintain a tow cable within the cable hook.

* * * * *